United States Patent [19]

Berard

[11] Patent Number: 5,622,299

[45] Date of Patent: Apr. 22, 1997

[54] SNOWMOBILE CARRYING UNIT

[76] Inventor: Randy M. Berard, P.O. Box 2039, South Burlington, Vt. 05407

[21] Appl. No.: 490,936

[22] Filed: Jun. 16, 1995

[51] Int. Cl.$^6$ ................................................. B65G 67/02
[52] U.S. Cl. ........................ 224/403; 224/281; 224/282; 414/462; 414/537; 296/3
[58] Field of Search ........................... 224/402, 403, 224/404, 405, 310, 311, 281, 282; 296/3; 414/462, 471, 477, 478, 480, 482, 483, 484, 485, 532, 537

[56] References Cited

U.S. PATENT DOCUMENTS

| | | | |
|---|---|---|---|
| 3,536,214 | 10/1970 | Sorg | 414/537 |
| 3,604,579 | 9/1971 | Jenkins | 414/482 |
| 3,704,794 | 12/1972 | Flamm | 414/537 |
| 3,757,972 | 9/1973 | Martin | 414/462 |
| 3,912,139 | 10/1975 | Bowman | 224/403 |
| 4,109,809 | 8/1978 | Clark | 414/480 |
| 4,470,746 | 9/1984 | Delachapelle | 414/470 |
| 4,874,284 | 10/1989 | New, Jr. | 414/537 |
| 5,044,845 | 9/1991 | Baker, Jr. | 414/462 |
| 5,287,579 | 2/1994 | Estevez, Jr. | 414/537 |
| 5,380,141 | 1/1995 | Flowers | 224/310 |
| 5,393,191 | 2/1995 | Alexander | 414/537 |

Primary Examiner—Henry J. Recla
Assistant Examiner—Gregory M. Vidovich
Attorney, Agent, or Firm—John J. Welch, Jr. Esq.

[57] ABSTRACT

A snowmobile carrying unit fitted to the loadbed of a pickup truck has four plungers held with pins to the downwardly directed four legs of the top portion of a two-piece bedrack which hold the bedrack fast to the sidewalls of the loadbed. An eight wheel dolly rides in channels in the two tracks of the top portion of the bedrack which is held to the bottom portion by pins placed through complementary holes. A circular track atop the dolly receives four wheels on the bottom of a flat rotatable carriage unit with bar on rod locking assembly units received by threaded holes in the floor of the carriage. The leading edge and the trailing edge of the carriage have two slits each amenable to receipt of swivel locks. The carriage can be locked in position by way of a first shaft on a push-pull locking assembly on the dolly that causes insertion of the first shaft into one of four holes within a plate which plate is affixed to the middle of the bottom of the carriage which has a center hole positionally in symmetry with a center hole in the plate with both centerholes amenable to receipt of a second shaft likewise receivable at the same time by a centerhole in the dolly about which second shaft, the carriage is pivotable. A detachable, foldable ramp facilitates snowmobile loading onto the carriage unit and removal therefrom at a port of final destination.

4 Claims, 9 Drawing Sheets

SNOWMOBILE CARRYING UNIT

BACKGROUND OF THE INVENTION

1. Field of the Invention

The instant invention relates to that class of devices that serves to facilitate the transportation of recreational vehicles.

2. Prior Art

The following references may remotely resemble but do not anticipate the instant invention:

| Inventor | Invention | Patent No. | Date |
| --- | --- | --- | --- |
| S. G. Ward | Snowmobile Loading and Unloading Device For Pickup Trucks | 3,720,335 | 3/13/73 |
| Boelter | Trailer Assembly For Snowmobiles | 4,222,698 | 9/16/80 |
| Lloyd | Snowmobile Loading Apparatus | 3,977,545 | 8/31/76 |
| Relletier | Apparatus to Displace a Snowmobile | 3,690,481 | 9/12/72 |
| Martin | Vehicle Carrier Assembly and Method | 3,757,972 | 9/11/73 |
| Flamm | Vehicle Mounted Equipment Deck and Ramp | 3,704,794 | 12/15/72 |
| New, Jr. | Kit for Transporting All Terrain Vehicles | 4,874,284 | 10/17/89 |
| Hargrove | Universal Pickup Truck Bed Liner, Loading Ramp and Ladder Assembly | 4,990,049 | 2/5/91 |
| Drabing | Motorcycle Maneuvering Device | 4,901,647 | 2/20/90 |
| Gladney et al. | Ramp for Loading Small Motorized Vehicles on Pickup Trucks | 4,700,421 | 10/20/87 |

SUMMARY OF THE INVENTION

The instant invention is made up of essentially eleven main components. One such component is a two-piece bedrack component that is amenable to being readily fitted to the loadbed portion of any pickup truck. The top piece has four downwardly directed hollow vertical legs. The bottom piece has four upwardly directed vertical arms. The legs are receiveable by the arm. A second component is a rollable dolly, the top side of which is characterized by the presence of a circular shaped trackbed. The dolly is also equipped with a third component namely what is called a "push-pull" locking assembly. The dolly consisting of a flat rack atop which is found the circular trackbed, has eight identical wheels, four to a side. The dolly rolls to and fro on two tracks found in the top piece of the invention's bedrack component. The invention's fourth component is a flat rectangular shaped carriage platform unit. This carriage unit has four wheels on its underside each of which is equidistant from the geometrical center of the carriage unit and each of which is pivotable through an angle of 180° so as to be amenable to being angulated with reference to the planes of each of its sides in order to always be readily received by the circular shaped trackbed of the invention's dolly component. The component has width slightly in excess of twice the width of a garden variety recreational snowmobile. The geometric center of the carriage component unit is a hole that receives a center shaft that is also received by a hole in the geometric center of the dolly. In this way, the carriage is held to the dolly. The center hole of the carriage is also concentric with the center hole of a fifth component, namely, a plate welded to the bottom side of the carriage. There are four slotted holes each 90° removed from the other about the center hole in this plate. Each of these four slotted shaft holes is amenable to receipt of a shaft on the "push-pull" locking assembly. This assembly enables the carriage to be rotated through 360° and locked in any one of four positions 90° from one another. There are two threaded floor holes near the leading of the carriage and outside of each hole is a slit and a slot in the floor of carriage as well. There are two more threaded floor holes and two more similarly situated slits and slots in the floor near the trailing edge of the carriage as well. A sixth and a seventh component of the invention are two identical swivel lock units that serve to lock the carriage, by way of the two slits near either the carriage's leading edge or its trailing edge to the invention's rackbed component. Eighth and ninth components are two identical rotatable bar on rod locking assemblies. Each of these units fits barwise over the ski portions of each of up to two snowmobiles amenable to being transported atop the carriage. As the screw with respect to each is threaded down into each of the two threaded holes near the leading edge of the carriage or near the trailing edge of the carriage in the event that the carriage is rotated through 180° so that the former trailing edge becomes the leading edge and vice-versa, this promotes tightening down of the two snowmobiles to be transported from one place to another. In lieu of these components, strapping held via J hooks at each end of the strapping to the curled over lateral sides of the carriage unit, one hook per side could serve as well to tighten down the two snowmobiles to be so transported. Two pairs of identical leveling systems consisting of hollow plunger components receivable by holes laterally located in the arms and legs of the bedrack component as well as being comprised of anteriorly positioned holes amenable to receiving pins through holes in the anterior sides of the arms and legs are tenth and eleventh components which serve to hold the instant invention fast to the respective sidewalls of the back of a pickup truck holding the bedrack component. At right angles to all of the aforementioned bedrack holes are further bedrack holes amenable to receipt by pins to lift or lower the upper portion of the bedrack to accommodate pickups with tall or short sidewalls as the case may be. A twelfth component is a detachable down loading ramp that is either foldable about a hinge in respect of one variant or not in respect of a second variant in order to facilitate its transportability. The ramp has an angulated lip at one end that fits over a lip rim located at either the leading edge or the trailing edge of the carriage unit.

OBJECTS OF THE INVENTION

It is desirable not only to be able to readily transport recreational snowmobiles from one place to another within the loadbed portion in the back of a pickup truck, but also to be able to do so with stability and ease whereas snowmobiles do not have a reverse gear. Since they do not have a reverse gear, it would be extremely difficult if not virtually impossible to unload snowmobiles previously driven up onto a towing bed on the back of a pickup truck, if that towing bed were not rotatable through an angle of 180 degrees so that such loaded snowmobiles without reverse gears could thereby be simply driven off the towing bed at their point of destination. The instant invention serves to readily facilitate the unloading of transported snowmobiles lacking reverse gears by virtue of the rotatability of the towing bed, namely a carriage upon which such snowmobiles rest during transit, through an angle of 180 degrees once a final destination is reached. Also, it is desirable to be assured during transport that snowmobiles on such a towing bed are sturdily tied down in transit. The instant invention accomplishes this end most readily as well. Moreover, whereas it may often be necessary to unload transported snowmobiles from the side rather than the back of a pickup truck, as, for instance, where a port of destination is not readily amenable to placement of an unloading ramp at the back of a truck, rotatability with stability through angles of 90 degrees, another feature of the instant invention, renders such unloading readily possible.

In view of the foregoing, respectfully submitted, the instant invention represents a truly radical departure from the current art relating to those devices presently utilized to facilitate transportation of snowmobiles.

DESCRIPTION OF THE PREFERRED EMBODIMENT

Figure 1:
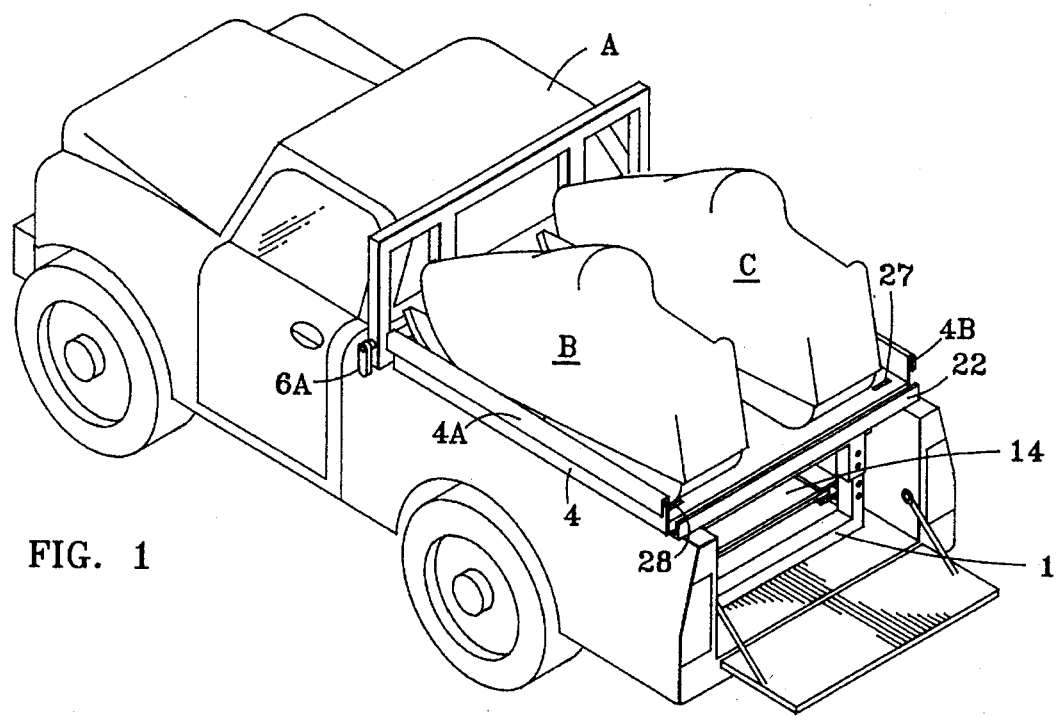
FIG. 1 is a perspective view of a pickup truck equipped with the instant invention shown carrying two snowmobiles.
Figure 2:
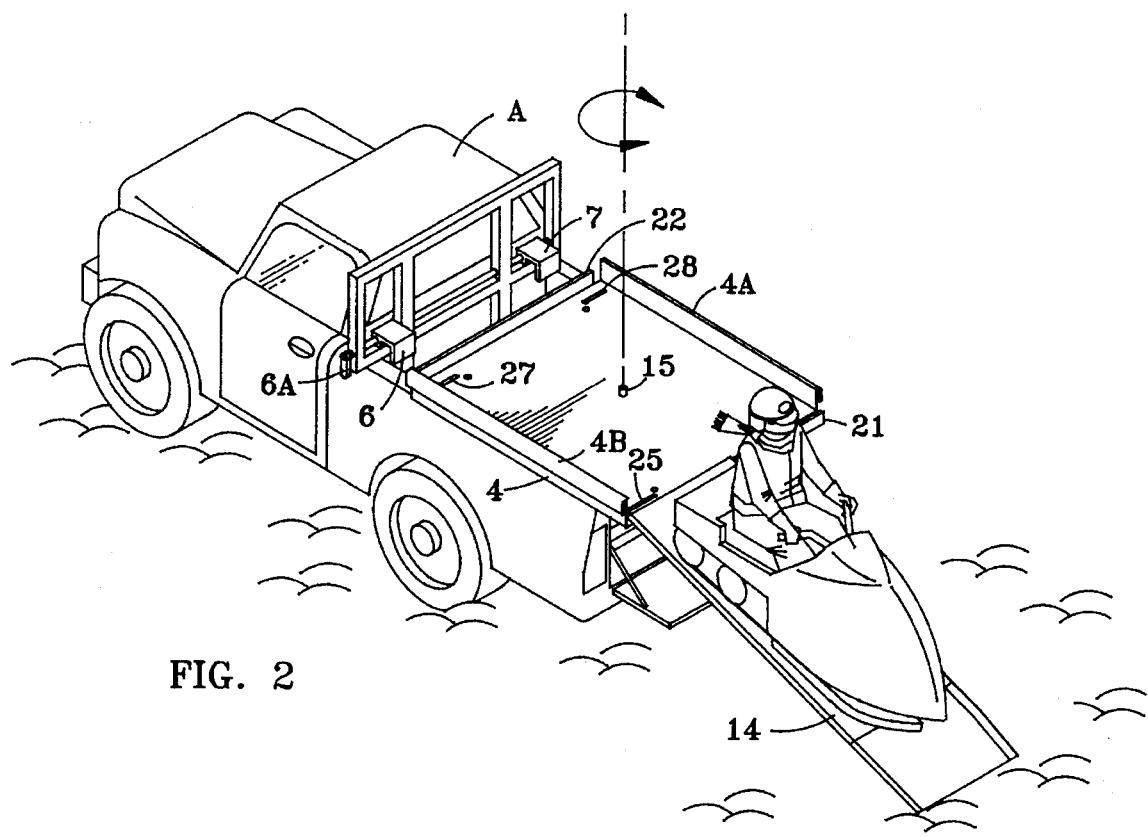
FIG. 2 is a perspective view of the unloading of a snowmobile off from the instant invention.
Figure 3:
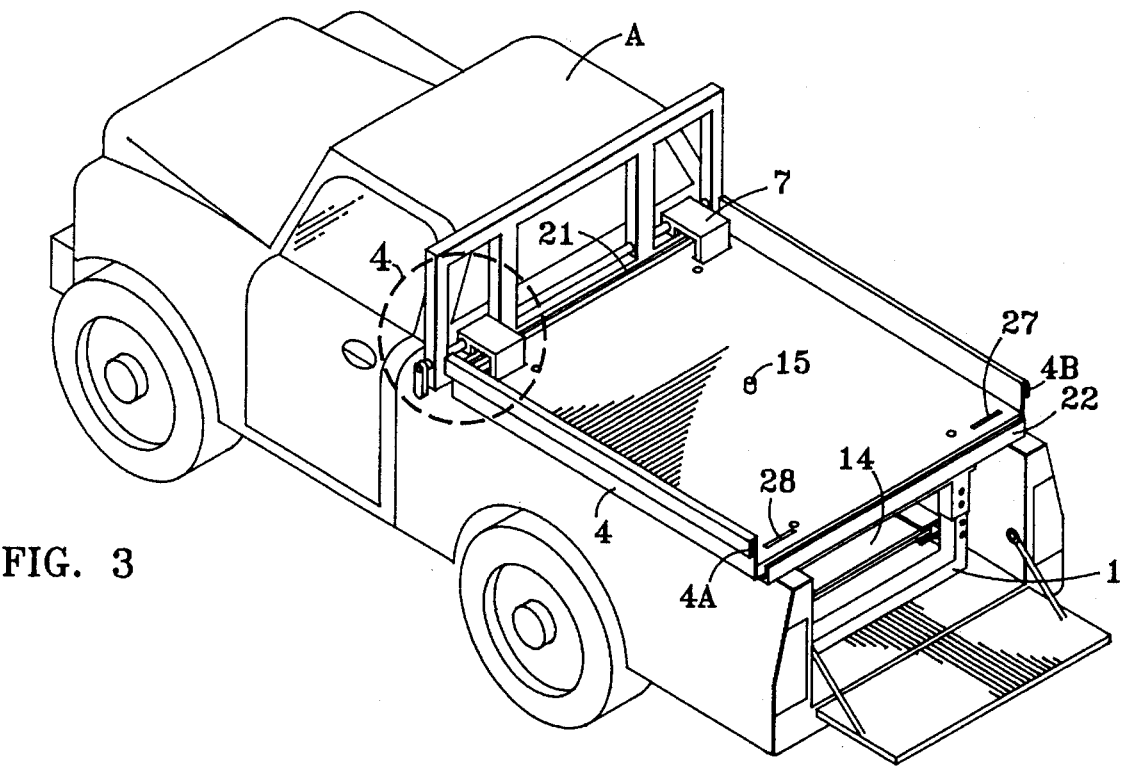
FIG. 3 is a perspective view of the instant invention on the back of a pickup truck.
Figure 4:
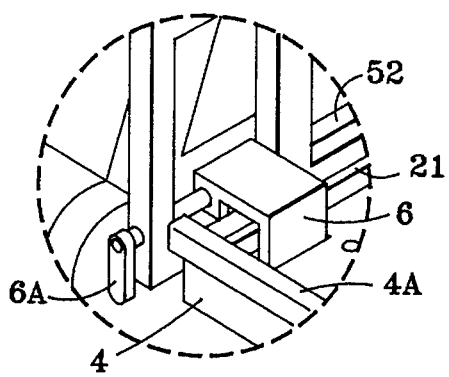
FIG. 4 is an isolated perspective view of one of the instant invention's swivel-lock components shown in the locked position.
Figure 5:
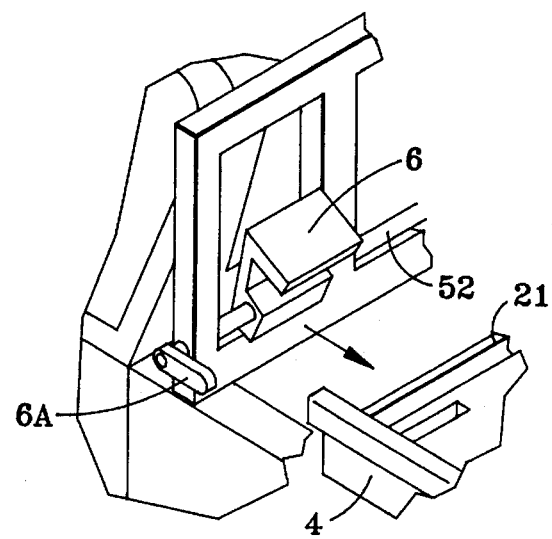
FIG. 5 is an isolated perspective view of one of the instant invention's swivel-lock components shown in the open position.
Figure 6:
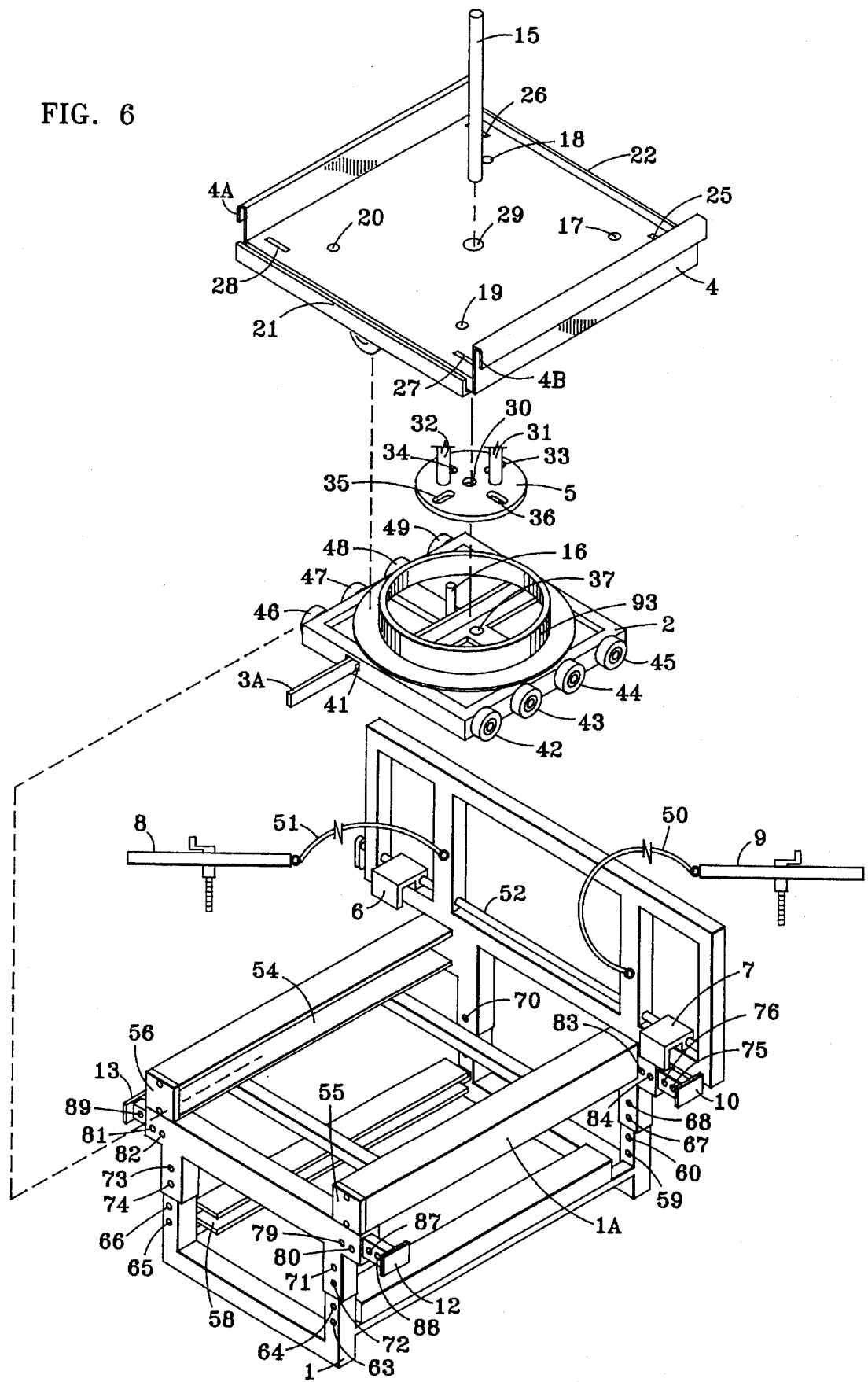
FIG. 6 is an exploded perspective view of the various components of the instant invention.
Figure 7:
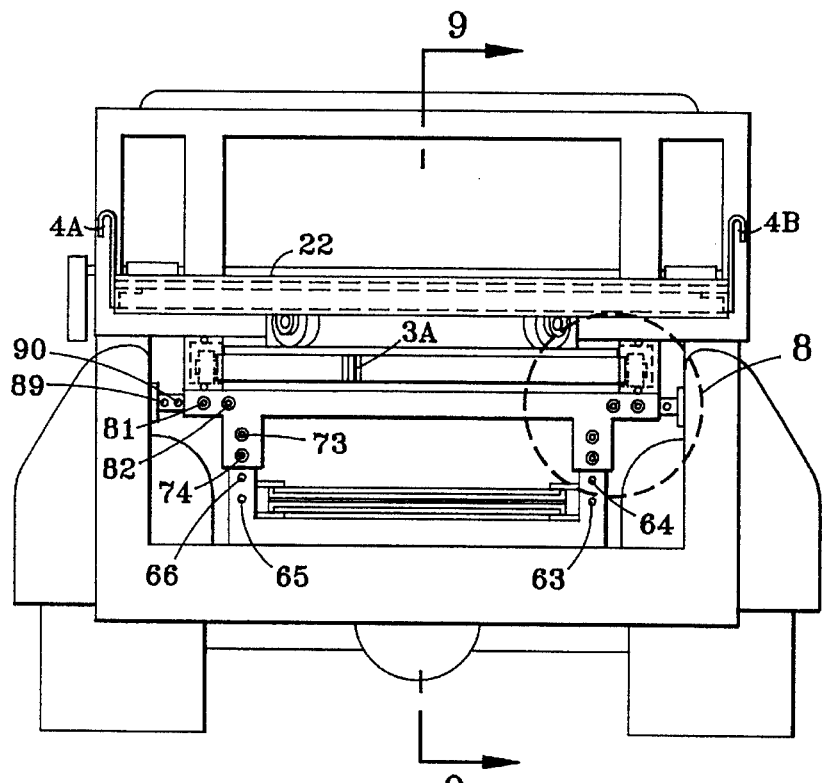
FIG. 7 is a rear view of the instant invention on the back of a pickup truck.
Figure 8:
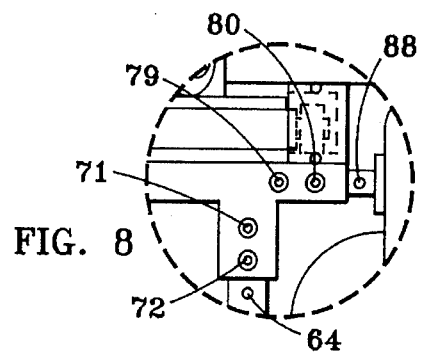
FIG. 8 is an isolated view of one of the instant invention's pin and plunger assembly features.
Figure 9:
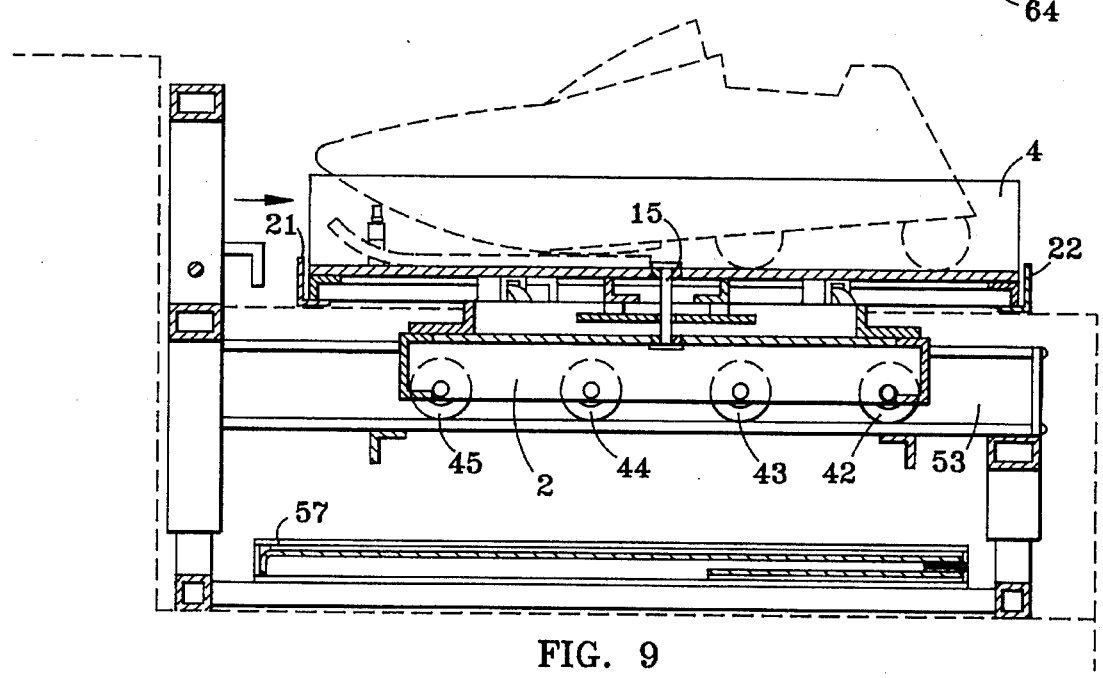
FIG. 9 is a lateral cross-sectional view of the instant invention.

A pickup truck A equipped with the instant invention carrying a pair of locked down garden variety recreational snowmobiles B and C is shown in FIG. 1. FIG. 2 illustrates the manner in which a snowmobile having been transported to a destination point via the instant invention is then downloaded. It will be noted that in FIG. 2, carriage platform unit 4 has been rotated through an angle of 180° in order to facilitate unloading of snowmobiles which have no reverse gear that were originally driven up onto carriage platform unit 4. FIG. 3 is a perspective view of a pickup truck A equipped with the instant invention. FIG. 6 is an exploded view of all of the various components and features of the instant invention. The first of these components is a bedrack made up of a base portion 1 which is a four armed rectangular shaped carrying frame unit and a top portion 1A which is a four legged support frame with four hollowed out legs that respectively fit over each of four upwardly extending arms of base portion 1. Top portion 1A is further characterized by the presence of two track sections consisting of dollywheel receiving channels 53 and 54 as well as of detachable stop-plates 55 and 56 respectively. The inside portion of channel 53 is seen in FIG. 9. The outer wall of channel 53 is also seen in FIG. 6. Moreover, as per FIG. 6, the frontal aspect of top portion 1A is a protective frame unit that abuts and is positionally parallel to the plane of the rear window of the cab portion of a pickup truck A. The protective frame unit lies perpendicular to the tracks of top portion 1A into which channels 53 and 54 are respectively constructed. The bedrack once placed into the rear of a pickup truck A is adjusted to fit snugly to the sidewalls of the loadbed portion of pickup truck A and likewise so as to accommodate the height of the sidewalls of pickup truck A. Such adjustment is initially accomplished, once the assembled bedrack is placed in the back of a pickup truck A, by adjusting top portion 1A up or down on base portion 1 in order to accommodate the height of the sidewalls of the carrying portion of truck A and then inserting pins through, for example, holes 70, 71 and 64, holes 73 and 66, holes 68 and 60, etc., and such adjustment is finally accomplished by means of adjusting plungers 10, 11, 12 and 13 one each into each of four plunger unit holes laterally located one each in each of the four legs of top portion 1A serving to respectively receive one each of one each of plungers 10, 11, 12 and 13 in order to cause the bedrack to fit snugly to the sidewalls of pickup truck A by way of inserting pins through, for example, holes 76 and 83, holes 79 and 87 holes 82 and 90, etc. The manner of such adjustment is more readily appreciated with resort to FIGS. 7 and 8 that illustrate the above-noted means for accomplishing same in greater detail. Top portion 1A also features two swivel lock assembly system 6 and 7 held together by a connecting rod 52. As seen in detail in FIG. 5, with reference initially to FIG. 4, rotatable swivel lock handle 6A affixed to rotatable connecting rod 52 when rotatedcounterclock-wise causes swivel lock platform retainer 6 also affixed to connecting rod 52 to be lifted upwards. Swivel lock platform retainer 7 also affixed to connecting rod 52 is simultaneously then lifted upwards as well. The connection of retainers 6 and 7 to rod 52 is seen in FIG. 6. FIGS. 4 and 5 respectively show the left hand swivel lock assembly 6 of the instant invention in the closed and then the open position. FIG. 3 depicts in isolation, with reference to an overall perspective view of a pickup truck A equipped with the instant invention, what is seen in FIG. 4 to illustrate how the closed swivel lock assemblies 6 and 7 hold the instant invention's carriage platform unit 4 in place via, for example, retainer containment within slits 25 and 26. Carriage platform unit 4 has width slightly greater than twice the width of a garden variety recreational snowmobile. Once the bedrack is installed and suitably adjusted to the loadbed portion of pickup truck A, stop-plates 55 and 56 are respectively removed from where they're found namely at the respective ends of the two dollywheel receiving channels 53 and 54 of top portion 1A. This then enables one to affix the instant invention's dolly component 2 to top portion 1A of its bedrack component by rolling dolly 2's dollywheels; 42, 43, 44, 45 and 46, 47, 48 and 49 respectively into channels 53 and 54 of top portion 1A. Dolly component 2 also seen in FIG. 6 and again in top view in FIG. 14 and in lateral view in FIG. 15 is then affixed to top portion 1A by way of reattaching by way of, for example, screws and bolts, stop-plates 55 and 56 to the respective posterior ends of the respective dollywheel receiving channels, 53 and 54 of top portion 1A.

Figure 10:
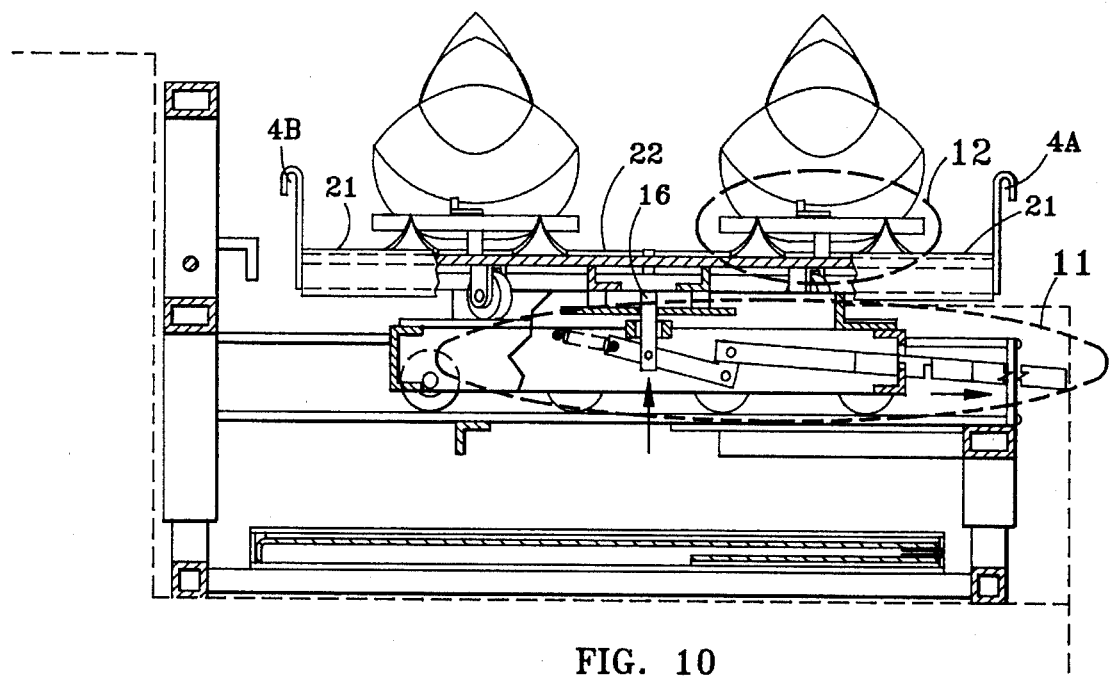
FIG. 10 is a lateral cross-sectional view of what is shown in FIG. 9 but rotated through an angle of 90° and further showing the instant invention's push-pull locking assembly.
Figure 11:
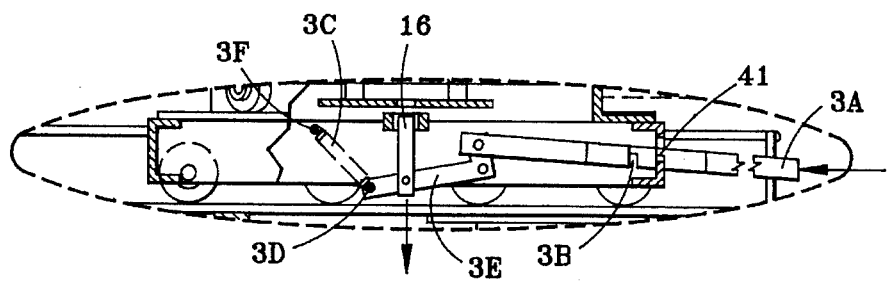
FIG. 11 is an isolated cross-sectional view of the instant invention's push-pull locking assembly.
Figure 12:
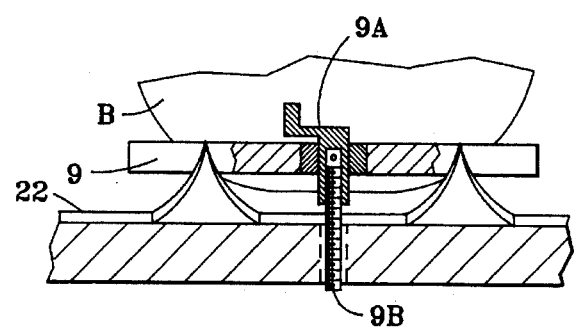
FIG. 12 is an isolated cross-sectional view of one of the instant invention's bar on screw locking assemblies.
Figure 13:
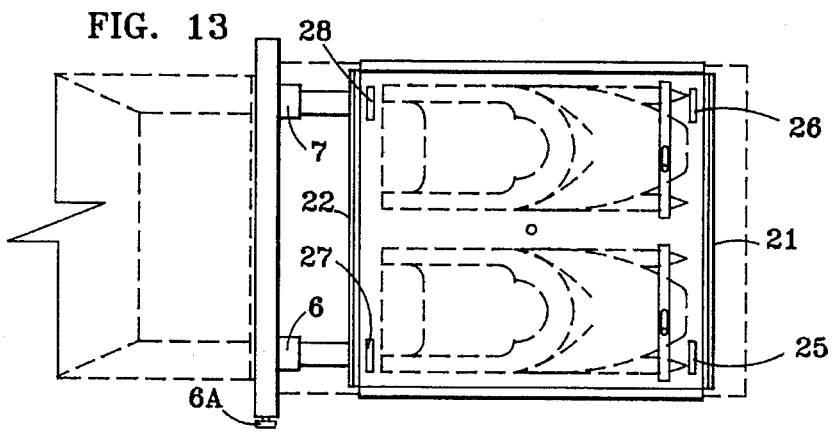
FIG. 13 is a schematic top plan view of the instant invention rotated through an angle of 180° with reference to the front of the pickup truck upon which it is affixed.
Figure 14:
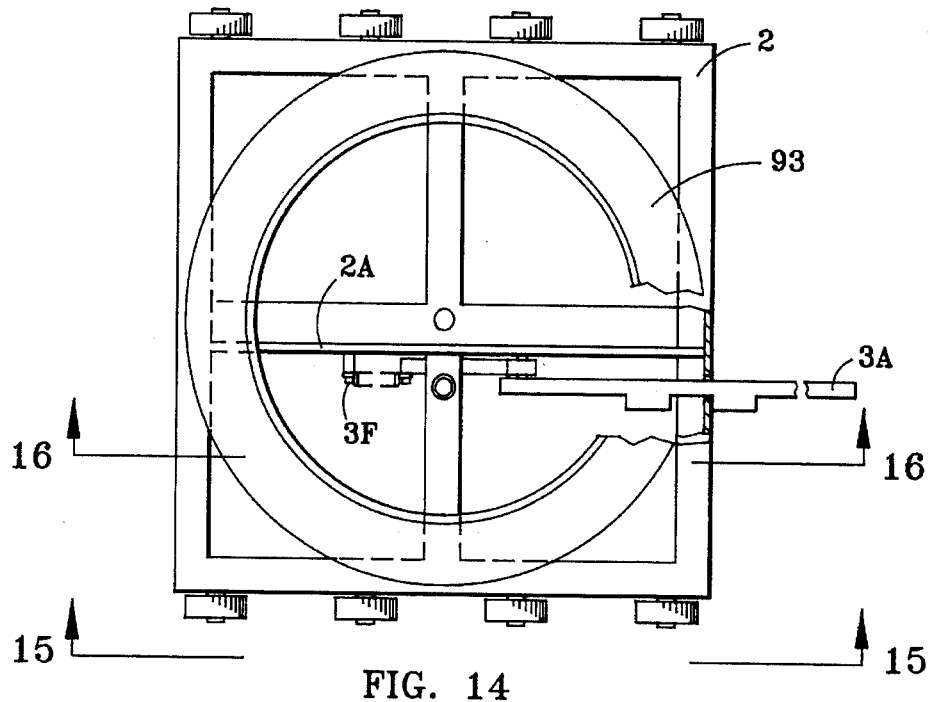
FIG. 14 is a top plan view of the instant invention's dolly component.
Figure 15:
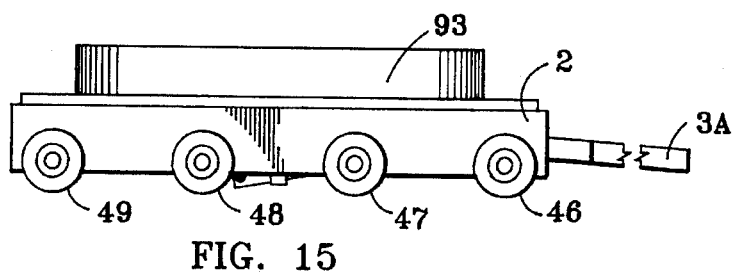
FIG. 15 is a lateral plan view of the instant invention's dolly component.
Figure 16:
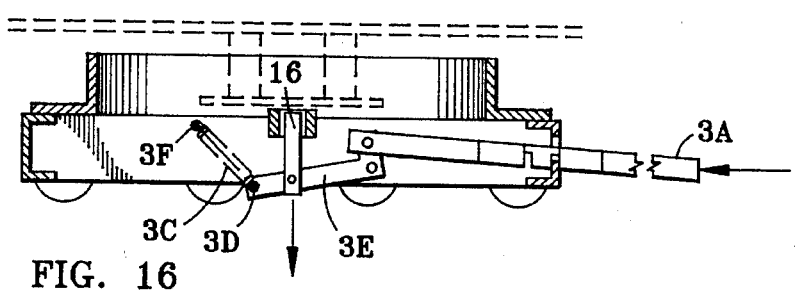
FIG. 16 is a lateral cross-sectional plan view of the instant invention's dolly component showing in particular its push-pull locking assembly in the unlocked position.
Figure 17:
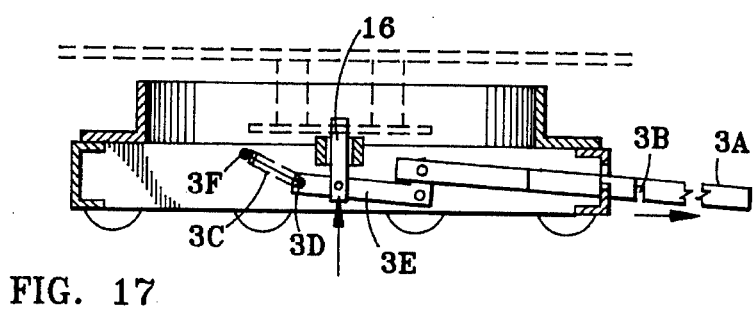
FIG. 17 is a lateral cross-sectional plan of the instant invention's dolly component showing in particular its push-pull locking assembly in the locked position.
Figure 18:
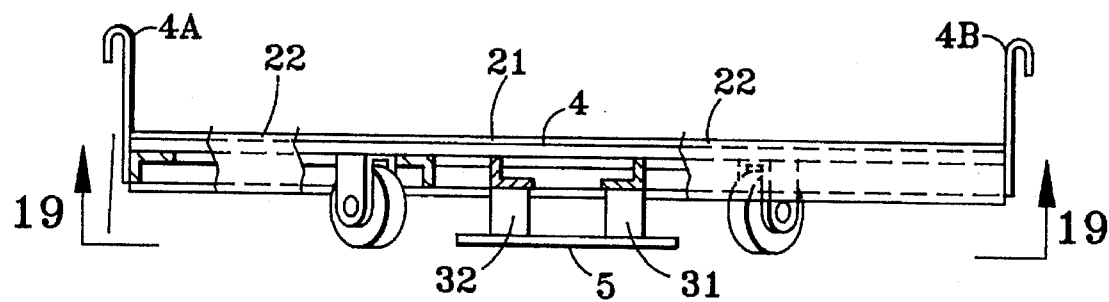
FIG. 18 is a lateral plan view of the carriage component of the instant invention.
Figure 19:
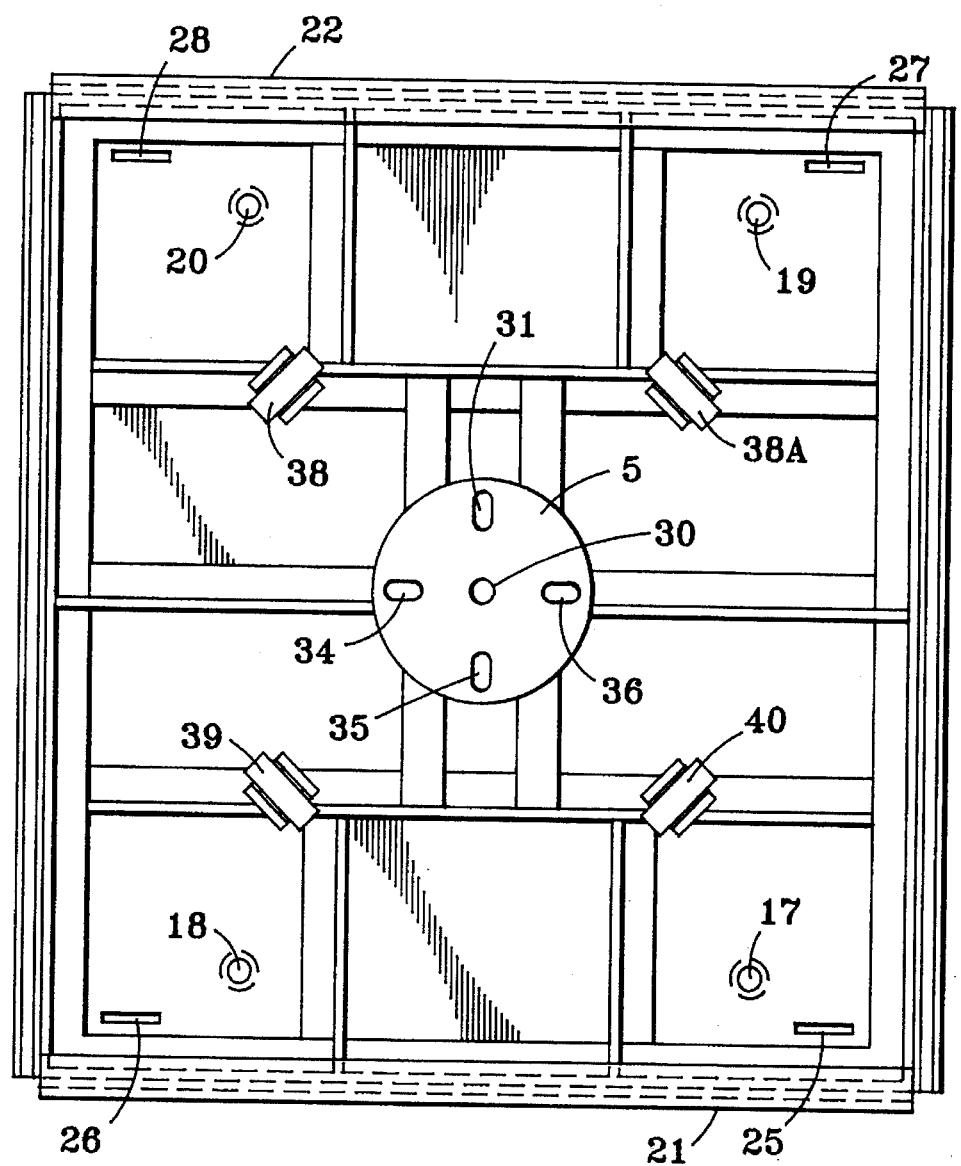
FIG. 19 is a bottom plan view of the carriage component of the instant invention.
Figure 20:
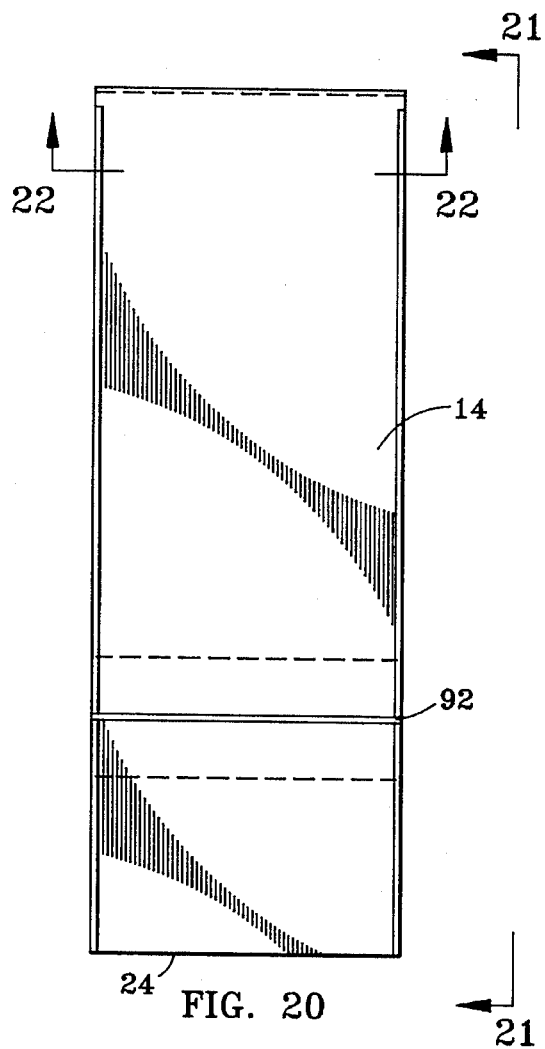
FIG. 20 is a top plan view of the instant invention's ramp component.
Figure 21:
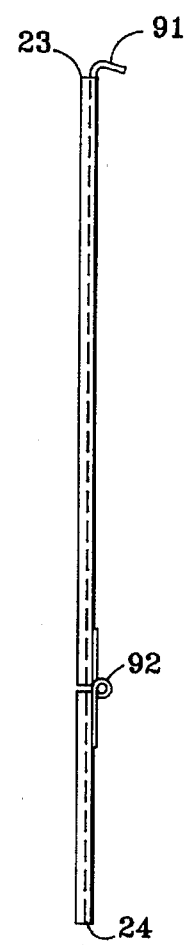
FIG. 21 is a lateral plan view of the instant invention's ramp component.
Figure 22:
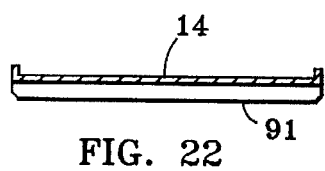
FIG. 22 is an end view evidencing the lip of the instant invention's ramp component.
Figure 23:
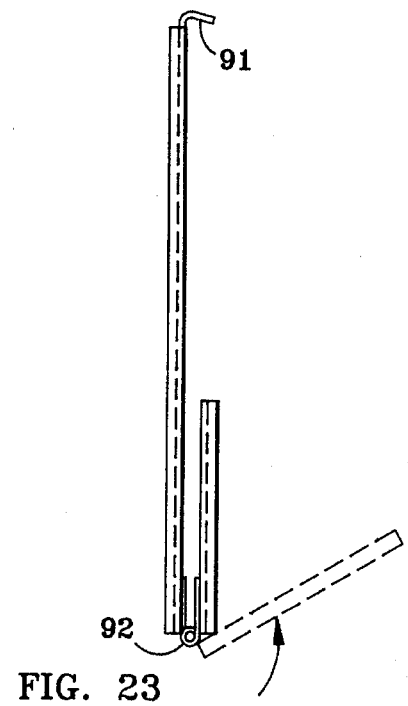
FIG. 23 is a lateral plan view of the instant invention's ramp component showing its foldability about a hinge.
Figures 24, 25:
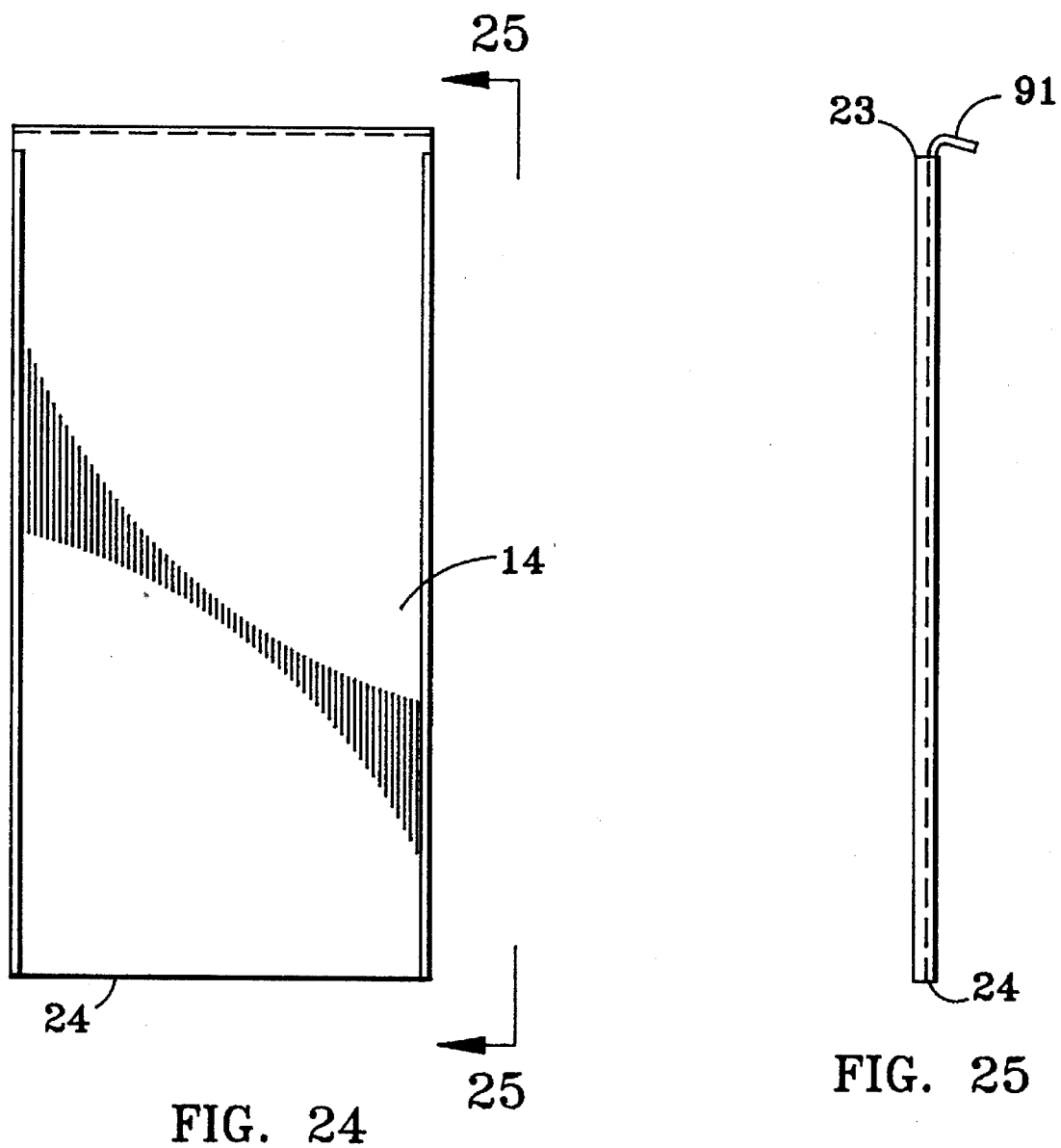
FIG. 24 is a top plan view of a variant of the instant invention's ramp component without a hinge.
FIG. 25 is a lateral plan view of what is seen in FIG. 24.

Once dolly component 2 is adjusted and in place as noted above, center shaft 15, insertable through centerhole 29 of carriage platform unit 4 to which circular plate 5 has been affixed via legs 31 and 32, is insertable as well through plate centerhole 30 located in the middle of plate 5 for ultimate receipt by vertical shafthole 37 located within a crossbrace structure within the middle of dolly 2 adjacent the intersection of the legs of crossbrace as circular platform wheel track 93 seen in FIGS. 6 and 14 consisting of a circular disc element to which a hollow cylindrical element is affixed receives the four platform wheels; 38, 38A 39 and 40 rotatably attached to the bottom of carriage platform unit 4. The four legged perpendicular cross brace a support structure within which hole 37 is found is attached one leg per sidewall to the inner sidewells of dolly 2. The positions of each platform wheel; 38, 38A, 39 and 40 on carriage 4 as well as that of plate 5 affixed to the bottom of carriage 4 are appreciated with resort to FIGS. 18 and 19. From the foregoing recitations, one is able to comprehend the manner in which the instant invention is assembled to and locked in place within the back of a pickup truck A. Shaft 15 can simply be removed from holes 29, 30 and 37 when disassembly of the invention is contemplated. Before loading any snowmobiles B and C onto carriage 4 however via ramp 14, carriage platform unit 4 must be locked in place as noted previously such that one edge of carriage 4 platform unit characterized by the presence of slits, for example slits 25 and 26 is in apposition to the cab of pickup truck A and the other opposite edge of carriage platform unit 4 characterized by the presence of slits 27 and 28 is in apposition to the rear of pickup truck A. This positioning is made possible by way of turning carriage platform unit 4 affixed to plate 5 through angles in multiples of 90° as can be seen with resort to FIG. 10 in order to permit locking rod shaft 16 of dolly 2's push-pull locking assembly 3 to fit through a vertical dollyhole adjacent the intersection of the legs of the cross brace and then in turn through hole 33 or hole 34 or hole 35 or hole 36 of plate 5 after locking rod handle lever 3A seen in FIG. 11 is pulled back then locked via notch 3B fitted to slot hole 41 as seen also in FIG. 17 after causing extension of spring 3C attached at point 3D to connecting arm 3E by pulling handle 3A to which arm 3E is pivotably connected to thereby force locking rod shaft 16 upwards into one of the holes 33, 34, 35 or 36 in plate 5 to thereby lock carriage platform unit 4 into place. Notch 3B in handle 3A serves to hold handle 3A in the locked position by way of placement of notch 3B onto the bottom edge of slot hole 41 of dolly 2 through which handle 3A protrudes as can be seen in FIG. 6. FIGS. 11 and 16 show how pushing in on handle 3A causes locking rod 16 to drop down thereby rendering carriage platform unit 4 freely rotatable. One or two snowmobiles then driven up ramp 14 onto the deck of carriage platform unit 4 are themselves each ultimately locked down for transport purposes via either strapping run taut over the ski portions of the snowmobile or snowmobiles extending from one side of carriage platform unit 4 to the other and hooked under the rails of each side or via resort to utilization of one or two of each of two optional bar and rod locking assembly units 8 and 9 each tied as shown in FIG. 6 by way of optional lanyards 50 and 51 to the upright frontal part of top portion 1A. Bar 8 fits over the ski portion of a snowmobile C as shown in FIG. 12. Rotatable crank 8A is then rotated so as to cause threaded rod 8B to be received by threading in hole 18 of carriage platform unit 4 thereby securing snowmobile C via bar 8 for transport. Similarly, Bar 9 fits over the ski portion of a snowmobile B in the same manner as depicted in FIG. 12. Rotatable crank 9A is then rotated so as to cause threaded rod 9B to be received by threading in hole 17 of carriage platform unit 4 thereby securing snowmobile B via bar 9 for transport. Holes 20 and 19 of carriage platform unit 4 are readily amenable to receipt of threaded rods 8B and 9B respectively in the event that on any given occasion, the erstwhile trailing edge of carriage platform unit 4 would have become via rotation through 180° instead the leading edge of carriage platform unit 4. In lieu of the foregoing bar and crank assemblies, strapping amenable to tightening with J hooks at either end such as conventional tie-down or crank strapping held via each J hook to each of the curled over lateral sides 4A and 4B of carriage platform trait 4 could serve as well to tighten down snowmobile B and/or snowmobile C for transport. Once transportation of one or two snowmobiles locked down as noted above is complete, the locked down snowmobiles are unloaded simply by way of pushing in on locking rod handle 3A and causing locking rod 16 to drop down as per FIG. 11 in order to permit carriage platform unit 4 to be rotated through 90° for unloading via ramp 14 on the side of pickup truck A after swivel lock retainers 6 and 7 are moved to the open position as seen in FIG. 5. Rotating carriage platform unit 4 through an angle of 180° or an angle of 270° for such unloading purposes as exemplified in FIG. 13 could also, as respects, for example, 180° if desired, be accomplished. Once rotation of carriage platform unit 4 to the desired position is complete, locking rod handle 3 is pulled outward to thereby push locking rod 16 into the proper slotted rod hole 33, 34, 35 or 36 in plate 5 that corresponds to the position to which carriage platform unit 4 is sought to be rotated to. Stopplates 55 and 56 seen in FIGS. 6, 9 and 10 hold dolly 2 in dollywheel receiving channels 53 and 54 during such unloading. Once rotatable cranks 8A and 9A are turned so as to loosen bars 8 and 9 and free up snowmobiles B and C, the snowmobiles are able to be driven down ramp 14 off from the deck of carriage platform unit 4. After removal of the snowmobiles B and C is accomplished, locking rod handle 3 is pushed in so as to drop down locking rod 16 and permit rotation of carriage platform unit 4 through an angle of 90° so as to permit slits 25 and 26 or slits 27 and 28 to receive retainers 6 and 7 respectively after locking rod 3A is pulled back outward thereby pushing locking rod 16 back up through the appropriate hole in plate 5. Loading and unloading is accomplished by way of ramp 14 being inserted via lip 91 found at end 23 of ramp 14 seen in FIG. 21 into either lip rim 21 or lip rim 22 respectively found at the leading edge and trailing edge of carriage platform trait 4. The breadth of ramp 14 is roughly one-ball the breadth of carriage platform unit 4, just a bit in excess of the breadth of a snowmobile B or C. As shown in FIGS. 20, 21, 22 and 23, ramp 14 functions by being inserted via lip 91 into a lip rim as noted above such that hinge 92 faces groundward. Ramp 14's end 24 is the ramp end on the ground. After loading or unloading a snowmobile, ramp 14 is moved from one side of either lip rim 21 or lim rim 22 of carriage 4 to the other to load or unload a second snowmobile. When loading or unloading is completed, ramp 14 is lifted from the lip rim 21 or 22 having last held it and folded about hinge 92 as shown in FIG. 23 for storage within ramp receiving channels 57 and 58 spaced apart in excess of the width of ramp 14 as can be seen with resort to FIG. 9. A ramp 14 without a hinge 92 as seen in FIGS. 24 and 25 that would be approximately two-thirds the length of a ramp 14 with a hinge 92 is useful when the invention is mounted to vehicles with loadboxes that are located lower to the ground.

In closing, the above-noted features of height and width adjustability with reference to the sidewalks of a pickup truck A and rotatability of carriage 4 on a dolly track 93, respectfully submitted, render the instant invention clearly new, useful and unique inveritably a revolutionary manner where the matter of loading, transporting and unloading snowmobiles is concerned.

What is claimed is:

1. A snowmobile carrying unit, comprising;

a. a four armed rectangular shaped carrying frame unit;

b. a plurality of vertically positioned holes in each of said four arms which said four arms all point vertically upwards when said carrying frame unit is placed within the loadbed portion of a pickup truck with each of said four arms located one each at each of the four corners of said carrying frame unit;

c. a first ramp receiving channel affixed at a bottom side of said first ramp receiving channel to a first lateral side of said carrying frame unit with a top side of said first ramp receiving channel joined to a first external lateral side of said first ramp receiving channel in turn joined to said bottom side;

d. a second ramp receiving channel affixed at a bottom side of said second raton receiving channel to a second lateral side of said carrying frame unit with a top side of said second ramp receiving channel joined to a second external lateral side of said second ramp receiving channel in turn joined to said bottom side of said second ramp receiving channel with said first ramp receiving channel lying parallel to said second ramp receiving channel;

e. a four legged support frame unit with all four legs pointing vertically downward and atop of which there is affixed a rectangular shaped protective frame unit, the lie of which said protective frame unit is parallel to the backside of the cab portion of said pickup truck and perpendicular to the lie of said support frame unit when each of said four legs which are all hollow receive respectively one each of said four arms when said carrying unit is placed within the loadbed portion of said pickup truck;

f. a first rectangular shaped dollywheel receiving channel with a top side of said first dollywheel receiving channel joined to an external lateral side of said first dollywheel receiving channel with said external lateral side joined to a bottom side of said first dollywheel receiving channel which said bottom side extends from the left back edge of and left lateralmost edge of a posterior element of said support frame unit to the back side of an anterior element of said support frame unit;

g. a second rectangular shaped dollywheel receiving channel with a top side of said second dollywheel channel joined to an external lateral side of said second dollywheel receiving channel with said external lateral side of said second dollywheel receiving channel joined to a bottom side of said second dollywheel receiving channel which said bottom side extends from the right back edge of and right lateralmost edge of the posterior element of said support frame unit to the back side of the anterior element of said support frame unit with said second dollywheel receiving channel lying parallel to said first dollywheel receiving channel;

h. a plurality of vertically positioned holes in each of said four legs all of which line up with all of said vertically positioned holes in each of said four arms when said four legs receive said four arms when said four legged frame unit is vertically adjusted to one of a plurality of heights above the floor of the said loadbed portion of said pickup truck;

i. a plurality of pin means for insertion into one of said vertically positioned holes in each of said four legs and into a corresponding one of said vertically positioned holes in each of said four arms when said four legs receive said four arms and serving to stabilize said vertical adjustment to said one of a plurality of heights;

j. a plurality of horizontally positioned holes in each of said four legs positioned above and perpendicular to said vertically positioned holes in each of said four legs;

k. plunger unit holes laterally located one each in each of said four legs;

l. four plunger units each one of which is received by one each of said holes laterally located;

m. a plurality of horizontally positioned plunger holes in each of said plunger units each of which said horizontally positioned plunger holes line up with a corresponding one of said horizontally positioned leg holes when said four plungers units are received one each respectively by one of said holes laterally located, with said support frame unit horizontally adjusted via said received four plunger units to the breadth of the distance between the sidewalls of said loadbed portion of said pickup truck;

n. a plurality of pin means for insertion one each into one of said horizontally positioned holes in each of said four legs and into a corresponding one of said horizontally positioned plunger holes in each of said plunger units and serving to horizontally stabilize said support frame unit snug to the sidewalls of said loadbed portion of said pickup truck;

o. a first detachable stopplate affixed to the posterior edges of said first dollywheel receiving channel;

p. a second detachable stopplate affixed to the posterior edges of said second dollywheel receiving channel;

q. a rectangular shaped dolly unit with a plurality of first dollywheels on one side of said dolly unit receivable by said first dollywheel receiving channel and with a plurality of second dollywheels on a second side of said dolly unit receivable by said second dollywheel receiving channel;

r. a circular element affixed flush to the top side of said dolly unit, the external diameter of which said circular element equals in length the length of the longest side of said dolly unit;

s. a hollow cylindrical element with an internal diameter equal to the internal diameter of said hollow circular element and affixed to the top side of said hollow circular element;

t. a four legged perpendicular cross brace structure affixed one leg per sidewall to each of four inner sidewalls of said dolly unit;

u. a vertical dolly hole located adjacent the intersection point of said legs of said cross brace structure;

v. a slot hole in the posterior side of said dolly unit;

w. an elongated rectangular shaped locking and handle lever with a notch cut into its bottom side for receipt of a handle end of said lever by the bottom edge of said hole in said posterior side of said dolly unit;

x. a connecting arm pivotably connected at a first end to said rectangular shaped lever;

y. a vertically positioned locking rod shaft pivotably connected to said connecting arm;

z. one end of a spring element attached to a second end of said connecting arm;

aa. a second end of said spring element attached to the anteriormost leg of said cross brace structure anterior to said intersection point of said legs of said cross brace structure;

bb. a vertical shaft hole located adjacent said intersection point of said legs of said cross brace structure on the side of said intersection point opposite the location of said vertical dolly hole;

cc. a circular shaped plate characterized by the presence of a plate center hole and four equivalent laterally located slotted rod holes each positioned at an angle of 90° with reference to any two adjacent ones of said located rod holes;

dd. a rectangular shaped carriage platform unit with width slightly greater than two times the width of a garden variety recreational snowmobile, with two lateral sides having height above a flat floor level of said platform unit, the apices of which said two lateral sides curl outwardly and then downwardly resulting in clearances along the whole of the lengths of said two lateral sides as between the ends of said curled apices and the bodies of said two lateral sides, and with a centrally positioned carriage platform unit center hole;

ee. a pair of plate legs affixed to the top side of said circular shaped plate each of said plate legs being equidistant from the center of said center hole and each of said plate legs being affixed to a bottom side of said carriage platform unit each equidistant from the center of said platform center hole;

ff. four platform wheels each rotatably attached to said bottom side of said carriage platform unit and each of said platform wheels attached at right angles to each adjacently attached one of said platform wheels with each said platform wheel rotatable through an angle of at least 180°;

gg. a center shaft insertable simultaneously through said carriage platform unit center hole, said plate center hole and said vertical dolly hole so as to hold said carriage platform unit via said platform wheels upon said circular element to said dolly unit held via said first dollywheels within said first dollywheel receiving channel and said second dollywheels within said second dollywheel receiving channel when said first stopplate is affixed to posterior edges of said first dollywheel receiving channel and said second stopplate is affixed to posterior edges of said second dollywheel receiving channel;

hh. a rotatable swivel lock handle affixed to a rotatable connecting rod which is affixed to said protective frame unit and which said connecting rod has affixed to it, a left platform retainer in the shape of a letter L, the bottom leg of which said left platform retainer in a locked position points vertically downward and an identical right platform retainer, the bottom leg of which said right platform retainer in a locked position points vertically downwards;

ii. a right leading edge slit located in said carriage platform just posterior to the leading edge of said carriage platform;

jj. a left leading edge slit located in said carriage platform just posterior to the leading edge of said carriage platform;

kk. a right trailing edge slit located in said carriage platform just anterior to the trailing edge of said carriage platform;

ll. a left trailing edge slit located in said carriage platform just anterior to the trailing edge of said platform;

mm. a first upwardly directed L shaped lip rim spanning the length of said leading edge of said carriage unit and welded at the top side of the horizontal leg of said first lip rim to the bottom side of said carriage unit just posterior to said leading edge;

nn. a second upwardly directed L shaped lip rim spanning the length of the trailing edge of said carriage unit and welded at the top side of the horizontal leg of said second lip rim to the bottom side of said carriage unit just anterior to said trailing edge;

oo. said right leading edge slit and said left leading edge slit being respectively amenable to receipt of said right rotatable platform retainer and said left rotatable platform retainer when said retainers are rotated down to the locked position;

pp. said right trailing edge slit and said left trailing edge slit being respectively amenable to receipt of said right rotatable platform retainer and said left rotatable platform retainer when said retainers are rotated down to the locked position;

qq. a foldable two piece rectangularly shaped ramp with width slightly greater than the width of a garden variety recreational snowmobile with a lip extending at an angle from one end of a first portion of said ramp and amenable to receipt by either said first lip rim or said second lip rim with foldability accomplished by way of a hinge lying parallel to the end of said first portion of said ramp from which said lip extends and likewise parallel to the end of a second portion of said ramp, with said first portion and said second portion joined at said hinge and with said first portion having length roughly twice the length of said second portion;

rr. the distance from said first lateral side of said first ramp receiving channel to said second lateral side of said second ramp receiving channel being slightly in excess of the width of said ramp.

2. A snowmobile carrying unit, comprising:

a. a four armed rectangular shaped carrying frame unit;

b. a plurality of vertically positioned holes in each of said four arms which said four arms all point vertically upwards when said carrying frame unit is placed within the loadbed portion of a pickup truck with each of said four arms located one each at each of the four corners of said carrying frame unit;

c. a first ramp receiving channel affixed a bottom side of said first ramp receiving channel to a first lateral side of said carrying frame unit with a top side of said first ramp receiving channel joined to a first external lateral side of said first ramp receiving channel in turn joined to said bottom side;

d. a second ramp receiving channel affixed at a bottom side of said second ramp receiving channel to a second lateral side of said carrying frame unit with a top side of said second ramp receiving channel joined to a second external lateral side of said second ramp receiving channel in turn joined to said bottom side of said second ramp receiving channel with said first ramp receiving channel lying parallel to said second ramp receiving channel;

e. a four legged support frame unit with all four legs pointing vertically downward and atop of which there is affixed a rectangular shaped protective frame unit, the lie of which said protective frame unit is parallel to the backside of the cab portion of said pickup truck and perpendicular to the lie of said support frame unit when each of said four legs which are all hollow receive respectively one each of said four arms when said carrying unit is placed within the loadbed portion of said pickup truck;

f. a first rectangular shaped dollywheel receiving channel with a top side of said first dollywheel receiving channel joined to an external lateral side of said first dollywheel receiving channel with said external lateral side with said external lateral side joined to a bottom side of said first dollywheel receiving channel which said bottom side extends from the left back edge of and left lateralmost edge of a posterior element of said support frame unit to the back side of an anterior element of said support frame unit;

g. a second rectangular shaped dollywheel receiving channel with a top side of said second dollywheel receiving channel joined to an external lateral side of said second dollywheel receiving channel with said external lateral side of said second dollywheel receiving channel joined to a bottom side of said second dollywheel receiving channel which said bottom side extends from the right back edge of and right lateralmost edge of the posterior element of said support frame unit to the back side of the anterior element of said support frame unit with said second dollywheel receiving channel lying parallel to said first dollywheel receiving channel;

h. a plurality of vertically positioned holes in each of said four legs all of which line up with all of said vertically positioned holes in each of said four arms when said four legs receive said four arms when said four legged frame unit is vertically adjusted to one of a plurality of heights above the floor of the said loadbed portion of said pickup truck;

i. a plurality of pin means for insertion into one of said vertically positioned holes in each of said four legs and into a corresponding one of said vertically positioned holes in each of said four arms when said four legs receive said four arms and serving to stabilize said vertical adjustment to said one of a plurality of heights;

j. a plurality of horizontally positioned holes in each of said four legs positioned above and perpendicular to said vertically positioned holes in each of said four legs;

k. plunger unit holes laterally located one each in each of said four legs;

l. four plunger units each one of which is received by one each of said holes laterally located;

m. a plurality of horizontally positioned plunger holes in each of said plunger units each of which said horizontally positioned plunger holes line up with a corresponding one of said horizontally positioned leg holes when said four plungers units are received one each respectively by one of said holes laterally located, with said support frame unit horizontally adjusted via said received four plunger units to the breadth of the distance between the sidewalls of said loadbed portion of said pickup truck;

n. a plurality of pin means for insertion one each into one of said horizontally positioned holes in each of said four legs and into a corresponding one of said horizontally positioned plunger holes in each of said plunger units and serving to horizontally stabilize said support frame unit snug to the sidewalls of said loadbed portion of said pickup truck;

o. a first detachable stopplate affixed to the posterior edges of said first dollywheel receiving channel;

p. a second detachable stopplate affixed to the posterior edges of said second dollywheel receiving channel;

q. a rectangular shaped dolly unit with a plurality of first dollywheels on one side of said dolly unit receivable by said first dollywheel receiving channel and with a plurality of second dollywheels on a second side of said dolly unit receivable by said second dollywheel receiving channel;

r. a hollow circular element affixed flush to the top side of said dolly unit, the external diameter of which said circular element equals in length the length of the longest side of said dolly unit;

s. a hollow cylindrical element with an internal diameter equal to the internal diameter of said hollow circular element and affixed to the top side of said hollow circular element;

t. a four legged perpendicular cross brace structure affixed one leg per sidewall to each of four inner sidewalls of said dolly unit;

u. a vertical doily hole located adjacent the intersection point of said legs of said cross brace structure;

v. a hole in the posterior side of said dolly unit;

w. an elongated rectangular shaped locking and handle lever with a notch cut into its bottom side for receipt of a handle end of said lever by the bottom edge of said hole in said posterior side of said dolly unit;

x. a connecting arm pivotably connected at a first end to said rectangular shaped lever;

y. a vertically positioned locking rod shaft pivotably connected to said connecting arm;

z. one end of a spring element attached to a second end of said connecting arm;

aa. a second end of said spring element attached to the anteriormost leg of said cross brace structure anterior to said intersection point of said legs of said cross brace structure;

bb. a vertical shaft hole located adjacent said intersection point of said legs of said cross brace structure on the side of said intersection point opposite the location of said vertical dolly hole;

cc. a circular shaped plate characterized by the presence of a plate center hole and four equivalent laterally located slotted rod holes each positioned at an angle of 90° with reference to any two adjacent ones of said located rod holes;

dd. a rectangular shaped carriage platform unit with width slightly greater than two times the width of a garden variety recreational snowmobile and with a centrally positioned platform unit center hole;

ee. a pair of plate legs affixed to the top side of said circular shaped plate each of said plate legs being equidistant from the center of said center hole and each of said plate legs being affixed to a bottom side of said carriage platform unit each equidistant from the center of said platform center hole;

ff. four platform wheels each rotatably attached to said bottom side of said carriage platform unit and each of said platform wheels attached at right angles to each adjacently attached one of said platform wheels with each said platform wheel rotatable through an angle of at least 180°.

gg. a center shaft insertable simultaneously through said carriage platform unit center hole, said plate center hole and said vertical dolly hole so as to hold said carriage platform unit via said platform wheels upon said circular element to said dolly unit held via said first dollywheels within said first dollywheel receiving channel and said second dollywheels within said second dollywheel receiving channel when said first stopplate is affixed to posterior edges of said first dollywheel receiving channel and said second stopplate is affixed to posterior edges of said second dollywheel receiving channel;

hh. a rotatable swivel lock handle affixed to a rotatable connecting rod which is affixed to said protective frame unit and which said connecting rod has affixed to it, a left platform retainer in the shape of a letter L, the bottom leg of which said left platform retainer in a locked position points vertically downward and an identical right platform retainer, the bottom leg of which said right platform retainer in a locked position points vertically downwards;

ii. a right leading edge threaded carriage hole located in proximity to the right front corner of said carriage platform;

jj. a left leading edge threaded carriage hole located in proximity to the left front corner of said carriage platform;

kk. a right trailing edge threaded carriage hole located in proximity to the right rear corner of said carriage platform;

ll. a left trailing edge threaded carriage hole located in proximity to the left rear corner of said carriage platform;

mm. a first upwardly directed L shaped lip rim spanning the length of the leading edge of said carriage unit and welded at the top side of the horizontal leg of said first lip rim to the bottom side of said carriage unit just posterior to said leading edge;

nn. a second upwardly directed L shaped lip rim spanning the length of the trailing edge of said carriage unit and welded at the top side of the horizontal leg of said second lip rim to the bottom side of said carriage unit just anterior to said trailing edge;

oo. a right leading edge slit located in said carriage platform located anterior to said right leading edge threaded carriage hole;

pp. a left leading edge slit located in said carriage platform located anterior to said left leading edge threaded carriage hole;

qq. a right trailing edge slit located in said carriage platform located posterior to said right trailing edge threaded carriage hole;

rr. a left trailing edge slit located in said carriage platform located posterior to said left trailing edge threaded carriage hole;

ss. said right leading edge slit and said left leading edge slit being respectively amenable to receipt of said right rotatable platform retainer and said left rotatable platform retainer when said retainers are rotated down to the locked position;

tt. said right trailing edge slit and said left trailing edge slit being respectively amenable to receipt of said right rotatable platform retainer and said left rotatable platform retainer when said retainers are rotated down to the locked position;

uu. an identical pair of bars affixed perpendicularly each to one each of an identical pair of rotatable cranks, one bar per crank, the ends of each of which said cranks rods which are threaded and each said crank being accordingly amenable to being screwed down into any one of said threaded carriage holes with each said bar held via a lanyard to said protective frame unit;

vv. a foldable two piece rectangularly shaped ramp with width slightly greater than the width of a garden variety recreational snowmobile with a lip extending at an angle from one end of a first portion of said ramp and amenable to receipt by either said first lip rim or said second lip rim with foldability accomplished by way of a hinge lying parallel to the end of said first portion of said ramp from which said lip extends and likewise parallel to the end of a second portion of said ramp, with said first portion and said second portion joined at said hinge and with said first portion having length roughly twice the length of said second portion;

ww. the distance from said first lateral side of said first ramp receiving channel to said second lateral side of said second ramp receiving channel being slightly in excess of the width of said ramp.

3. A snowmobile carrying unit, comprising:

a. a four armed rectangular shaped carrying frame unit;

b. a plurality of vertically positioned holes in each of said four arms which said four arms all point vertically upwards when said carrying frame unit is placed within the loadbed portion of a pickup truck with each of said four arms located one each at each of the four corners of said carrying frame unit;

c. a first ramp receiving channel affixed at a bottom side of said first ramp receiving channel to a first lateral side of said carrying frame unit with a top side of said first ramp receiving channel joined to a first external lateral side of said first ramp receiving channel in turn joined to said bottom side;

d. a second ramp receiving channel affixed at a bottom side of said second ramp receiving channel to a second lateral side of said carrying frame unit with a top side of said second ramp receiving channel joined to a second external lateral side of said second ramp receiving channel in turn joined to said bottom side of said second ramp receiving channel with said first ramp receiving channel lying parallel to said second ramp receiving channel;

e. a four legged support frame unit with all four legs pointing vertically downward and atop of which there is affixed a rectangular shaped protective frame unit, the lie of which said protective frame unit is parallel to the backside of the cab portion of said pickup truck and perpendicular to the lie of said support frame unit when each of said four legs which are all hollow receive respectively one each of said four arm when said carrying unit is placed within the loadbed portion of said pickup truck;

f. a first rectangular shaped dollywheel receiving channel with a top side of said first dollywheel receiving channel joined to an external lateral side of said first dollywheel receiving channel with said external lateral side joined to a bottom side of said first dollywheel receiving channel which said bottom side extends from the left back edge of and left lateralmost edge of the posterior element of said support frame unit to the back side of an anterior element of said support frame unit;

g. a second rectangular shaped dollywheel receiving channel with a top side of said second dollywheel receiving channel joined to an external lateral side of said second dollywheel receiving channel with said external lateral side of said second dollywheel receiving channel joined to a bottom side of said second dollywheel receiving channel which said bottom side extends from the right back edge of and right lateralmost edge of the posterior element of said support frame unit to the back side of the anterior element of said support frame unit with said second dollywheel receiving channel lying parallel to said first dollywheel receiving channel;

h. a plurality of vertically positioned holes in each of said four legs all of which line up with all of said vertically positioned holes in each of said four arms when said four legs receive said four arms when said four legged frame unit is vertically adjusted to one of a plurality of heights above the floor of the said loadbed portion of said pickup truck;

i. a plurality of pin means for insertion into one of said vertically positioned holes in each of said four legs and into a corresponding one of said vertically positioned holes in each of said four arms when said four legs receive said four arms and serving to stabilize said vertical adjustment to said one of a plurality of heights;

j. a plurality of horizontally positioned holes in each of said four legs positioned above and perpendicular to said vertically positioned holes in each of said four legs;

k. plunger holes laterally located one each in each of said four legs;

l. four plunger units each one of which is received by one each of said holes laterally located;

m. a plurality of horizontally positioned plunger holes in each of said plunger units each of which said horizontally positioned plunger holes line up with a corresponding one of said horizontally positioned leg holes when said four plungers units are received one each respectively by one of said holes laterally located, with said support frame unit horizontally adjusted via said received four plunger units to the breadth of the distance between the sidewalls of said loadbed portion of said pickup truck;

n. a plurality of pin means for insertion one each into one of said horizontally positioned holes in each of said four legs and into a corresponding one of said horizontally positioned plunger holes in each of said plunger units and serving to horizontally stabilize said support frame unit snug to the sidewalls of said loadbed portion of said pickup truck;

o. a first detachable stopplate affixed to the posterior edges of said first dollywheel receiving channel;

p. a second detachable stopplate affixed to the posterior edges of said second dollywheel receiving channel;

q. a rectangular shaped dolly unit with a plurality of first dollywheels on one side of said dolly unit receivable by said first dollywheel receiving channel with a plurality of second dollywheels on a second side of said dolly unit receivable by said second dollywheel receiving channel;

r. a circular element after flush to the top side of said dolly unit, the external diameter of which said circular element equals in length the length of the longest side of said dolly unit;

s. a hollow cylindrical element with an internal diameter equal to the internal diameter of said hollow circular element and affixed to the top side of said hollow circular element;

t. a four legged perpendicular cross brace structure after one leg per sidewall to each of four inner sidewalls of said dolly unit;

u. a vertical dolly hole located adjacent the intersection point of said legs of said cross brace structure;

v. a slot hole in the posterior side of said dolly unit;

w. an elongated rectangular shaped locking and handle lever with a notch cut into its bottom side for receipt of a handle end of said lever by the bottom edge of said hole in said posterior side of said dolly unit;

x. a connecting arm pivotably connected at a first end to said rectangular shaped lever;

y. a vertically positioned locking rod shaft pivotably connected to said connecting arm;

z. one end of a spring element attached to a second end of said connecting arm;

aa. a second end of said spring element attached to the anteriormost legs of said cross brace structure anterior to said intersection point of said legs of said cross brace structure;

bb. a vertical shaft hole located adjacent said intersection point of said legs of said cross brace structure on the side of said intersection point opposite the location of said vertical dolly hole;

cc. a circular shaped plate characterized by the presence of a plate center hole and four equivalent laterally located slotted rod holes each positioned at an angle of 90° with reference to any two adjacent ones of said located rod holes;

dd. a rectangular shaped carriage platform unit with width slightly greater than two times the width of a garden variety recreational snowmobile, with two lateral sides having height above a flat floor level of said platform unit, the apices of which said two lateral sides curl outwardly and then, downwardly resulting in clearances along the whole of the lengths of said two lateral sides as between the ends of said curled apices and the bodies of said two lateral sides, and with a centrally positioned carriage platform unit center hole;

ee. a pair of plate legs affixed to the top side of said circular shaped plate each of said plate legs being equidistant from the center of said center hole and each of said plate legs being affixed to a bottom side of said carriage platform unit each equidistant from the center of said platform center hole;

ff. four platform wheels each rotatably attached to said bottom side of said carriage platform unit and each of said platform wheels attached at right angles to each adjacently attached one of said platform wheels with each said platform wheel rotatable through an angle of at least 180°.

gg. a center shaft insertable simultaneously through said carriage platform unit center hole, said plate center hole and said vertical dolly hole so as to hold said carriage platform unit via said platform wheels upon said circular element to said dolly unit held via said first dollywheels within said first dolly wheel receiving channel and said second dollywheel within said second dollywheels receiving channel when said first stopplate is affixed to posterior edges of said first dollywheel receiving channel and said second stopplate is affixed to posterior edges of said second dollywheel receiving channel;

hh. a rotatable swivel lock handle affixed to a rotatable connecting rod which is affixed to said protective frame unit and which said connecting rod has affixed to it, a left platform retainer in the shape of a letter L, the bottom leg of which said left platform retainer in a locked position points vertically downward and an identical right platform retainer, the bottom leg of which said right platform retainer in a locked position points vertically downwards;

ii. a right leading edge slit located in said carriage platform just posterior to the leading edge of said carriage platform;

jj. a left leading edge slit located in said carriage platform just posterior to the leading edge of said carriage platform;

kk. a right trailing edge slit located in said carriage platform just anterior to the trailing edge of said carriage platform;

ll. a left trailing edge slit located in said carriage platform just anterior to the trailing edge of said platform;

mm. a first upwardly directed L shaped lip rim spanning the length of said leading edge of said carriage unit and welded at the top side of the horizontal leg of said first lip rim to the bottom side of said carriage unit just posterior to said leading edge;

nn. a second upwardly directed L shaped lip rim spanning the length of the trailing edge of said carriage unit and welded at the top side of the horizontal leg of said second lip rim to the bottom side of said carriage unit just anterior to said trailing edge;

oo. said right leading edge slit and said left leading edge slit being respectively amenable to receipt of said right rotatable platform retainer and said left rotatable platform retainer when said retainers are rotated down to the locked position;

pp. said right trailing edge slit and said left trailing edge slit being respectively amenable to receipt of said right rotatable platform retainer and said left rotatable platform retainer when said retainers are rotated down to the locked position;

qq. a ramp with width slightly greater than the width of a garden variety recreational snowmobile with a lip extending at an angle from one end of said ramp and amenable to receipt by either said first lip rim or said second lip rim;

rr. the distance from said first lateral side of said first ramp receiving channel to said second lateral side of said second ramp receiving channel being slightly in excess of the width of said ramp.

4. A snowmobile carrying unit, comprising;

a. a four armed rectangular shaped carrying frame unit;

b. a plurality of vertically positioned holes in each of said four arms which said four arms all point vertically upwards when said carrying frame unit is placed within the loadbed portion of a pickup truck with each of said four arms located one each at each of the four corners of said carrying frame unit;

c. a first ramp receiving channel affixed at a bottom side of said first ramp receiving channel to a first lateral side of said carrying frame unit with a top side of said first ramp receiving channel joined to a first external lateral side of said second ramp receiving channel in turn joined to said bottom side;

d. a second ramp receiving channel affixed at a bottom side of said second ramp receiving channel to a second lateral side of said carrying frame unit with a top side of said second ramp receiving channel joined to a second external lateral side of said second ramp receiving channel in turn joined to said bottom side of said second ramp receiving channel with said first ramp receiving channel lying parallel to said second ramp receiving channel;

e. a four legged support frame unit with all four legs pointing vertically downward and atop of which there is affixed a rectangular shaped protective frame unit, the lie of which said protective frame unit is parallel to the backside of the cab portion of said pickup truck and perpendicular to the lie of said support frame unit when each of said four legs which are all hollow receive respectively one each of said four arms when said carrying unit is placed within the loadbed portion of said pickup truck;

f. a first rectangular shaped dollywheel receiving channel with a top side of said first dollywheel receiving channel joined to an external lateral side of said first dollywheel receiving channel with said external lateral side joined to a bottom side of said first dollywheel receiving channel which said bottom side extends from the left back edge of and left lateralmost edge of a posterior element of said support frame unit to the back side of an anterior element of said support frame unit;

g. a second rectangular shaped dollywheel receiving channel with a top side of said second dollywheel receiving channel joined to an external lateral side of said second dollywheel receiving channel with said external lateral side of said second dollywheel receiving channel joined to a bottom side which said bottom side extends from the right back edge of and right lateralmost edge of the posterior element of said support frame unit to the back side of the anterior element of said support frame unit with said second dollywheel receiving channel lying parallel to said first dollywheel receiving channel;

h. a plurality of vertically positioned holes in each of said four legs all of which line up with all of said vertically positioned holes in each of said four arm when said four legs receive said four arms when said four legged frame unit is vertically adjusted to one of a plurality of heights above the floor of the said loadbed portion of said pickup truck;

i. a plurality of pin means for insertion into one of said vertically positioned holes in each of said four legs and into a corresponding one of said vertically positioned holes in each of said four arms when said four legs receive said four arms and serving to stabilize said vertical adjustment to said one of a plurality of heights;

j. a plurality of horizontally positioned holes in each of said four legs positioned above and perpendicular to said vertically positioned holes in each of said four legs;

k. plunger unit holes laterally located one each in each of said four legs;

l. four plunger units each one of which is received by one each of said holes laterally located;

m. a plurality of horizontally positioned plunger holes in each of said plunger units each of which said plunger holes line up exactly with a corresponding one of said horizontally positioned leg holes when said four plungers units are received one each respectively by one of said holes laterally located, with said support frame unit horizontally adjusted via said received four plunger units to the breadth of the distance between the sidewalls of said loadbed portion of said pickup truck;

n. a plurality of pin means for insertion each one into one of said horizontally positioned holes in each of said four legs and into a corresponding one of said horizontally positioned plunger holes in each of said plunger units and serving to horizontally stabilize said support frame unit snug to the sidewalls of said loadbed portion of said pickup truck;

o. a first detachable stopplate affixed to the posterior edges of said first dollywheel receiving channel;

p. a second detachable stopplate affixed to the posterior edges of said second dollywheel receiving channel;

q. a rectangular shaped dolly unit with a plurality of first dollywheels on one side of said dolly unit receivable by said first dollywheel receiving channel and with a plurality of second dollywheels on a second side of said dolly unit receivable by said second dollywheel receiving channel;

r. a circular element affixed flush to the top side of said dolly unit, the external diameter of which said circular element equals in length the length of the longest side of said dolly unit;

s. a hollow cylindrical element with an internal diameter equal to the internal diameter of said hollow circular element and affixed to the top side of said hollow circular element;

t. a four legged perpendicular cross brace structure affixed one leg per sidewall to each of four inner sidewalls of said dolly unit;

u. a vertical dolly hole located adjacent the intersection point of said legs of said cross brace structure;

v. a slot hole in the posterior side of said dolly unit;

w. an elongated rectangular shaped locking and handle lever with a notch cut into its bottom side for receipt of a handle end of said lever by the bottom edge of said hole in said posterior side of said dolly unit;

x. a connecting arm pivotably connected at a first end to said rectangular shaped lever;

y. a vertically positioned locking rod shaft pivotably connected to said connecting arm;

z. one end of a spring element attached to a second end of said connecting arm;

aa. a second end of said spring element attached to the anteriormost leg of said cross brace structure anterior to said intersection point of said legs of said cross brace structure;

bb. a vertical shaft hole located adjacent said intersection point of said legs of said cross brace structure on the side of said intersection point opposite the location of said vertical dolly hole;

cc. a circular shaped plate characterized by the presence of a plate center hole and four equivalent laterally located shaft holes each positioned at an angle of 90° with reference to any two adjacent ones of said located shaft holes;

dd. a rectangular shaped carriage platform unit with width slightly greater than two times the width of a garden variety recreational snowmobile and with a centrally positioned platform unit center hole;

ee. a pair of plate legs affixed to the top side of said circular shaped plate each of said plate legs being equidistant from the center of said center hole and each of said plate legs being affixed to a bottom side of said carriage platform unit each equidistant from the center of said platform center hole;

ff. four platform wheels each rotatably attached to said bottom side of said carriage platform unit and each of said platform wheels attached at right angles to each adjacently attached one of said platform wheels with each said platform wheel rotatable through an angle of at least 180°.

gg. a center shaft insertable simultaneously through said carriage platform unit center hole, said plate center hole and said vertical dolly hole so as to hold said carriage platform unit via said platform wheels upon said circular element to said dolly unit held via said first dollywheels within said first dollywheel receiving channel and said second dollywheels within said second dollywheel receiving channel when said first stopplate is affixed to said posterior edges of said first dollywheel receiving channel and said second stopplate is affixed to said posterior edges of said second dollywheel receiving channel;

hh. a rotatable swivel lock handle affixed to a rotatable connecting rod which is affixed to said protective frame unit and which said connecting rod has affixed to it, a left platform retainer in the shape of a letter L, the bottom leg of which said left platform retainer in a locked position points vertically downward and an identical right platform retainer, the bottom leg of which said right platform retainer in a locked position points vertically downwards;

ii. a right leading edge threaded carriage hole located in proximity to the right front corner of said carriage platform;

jj. a left leading edge threaded carriage hole located in proximity to the left front corner of said carriage platform;

kk. a right trailing edge threaded carriage hole located in proximity to the right rear corner of said carriage platform;

ll. a left trailing edge threaded carriage hole located in proximity to the left rear corner of said carriage platform;

mm. a first upwardly directed L shaped lip rim spanning the length of the leading edge of said carriage unit and welded at the top side of the horizontal leg of said first lip rim to the bottom side of said carriage unit just posterior to said leading edge;

nn. a second upwardly directed L shaped lip rim spanning the length of the trailing edge of said carriage unit and welded at the top side of the horizontal leg of said second lip rim to the bottom side of said carriage unit just anterior to said trailing edge;

oo. a right leading edge slit located in said carriage platform located anterior to said right leading edge threaded carriage hole;

pp. a left leading edge slit located in said carriage platform located anterior to said left leading edge threaded carriage hole;

qq. a right trailing edge slit located in said carriage platform located posterior to said right trailing edge threaded carriage hole;

rr. a left trailing edge slit located in said carriage platform located posterior to said left trailing edge threaded carriage hole;

ss. said right leading edge slit and said left leading edge slit being respectively amenable to receipt of said right rotatable platform retainer and said left rotatable platform retainer when said retainers are rotated down to the locked position;

tt. said right trailing edge slit and said left trailing edge slit being respectively amenable to receipt of said right rotatable platform retainer and said left rotatable platform retainer when said retainers are rotated down to the locked position;

uu. an identical pair of bars affixed perpendicularly each to one each of an identical pair of rotatable cranks, one bar per crank, the ends of each of which said cranks are rods which are threaded and each said crank being accordingly amenable to being screwed down into any one of said threaded carriage holes with each said bar held via a lanyard to said protective frame unit;

vv. a ramp with width slightly greater than the width of a garden variety recreational snowmobile with a lip extending at an angle from one end of said ramp and amenable to receipt by either said first lip rim or said second lip rim;

ww. the distance from said first lateral side of said first ramp receiving channel to said second lateral side of said second ramp receiving channel being slightly in excess of the width of said ramp.

\* \* \* \* \*